(12) United States Patent
Pedretti

(10) Patent No.: US 8,469,023 B2
(45) Date of Patent: Jun. 25, 2013

(54) RADIATION COLLECTOR

(75) Inventor: Andrea Pedretti, Porza (CH)

(73) Assignee: Airlight Energy IP SA, Biasca (CH)

( * ) Notice: Subject to any disclaimer, the term of this patent is extended or adjusted under 35 U.S.C. 154(b) by 0 days.

(21) Appl. No.: 12/311,306

(22) PCT Filed: Sep. 28, 2007

(86) PCT No.: PCT/CH2007/000480
§ 371 (c)(1),
(2), (4) Date: May 12, 2009

(87) PCT Pub. No.: WO2008/037108
PCT Pub. Date: Apr. 3, 2008

(65) Prior Publication Data
US 2009/0272375 A1    Nov. 5, 2009

(30) Foreign Application Priority Data

Sep. 27, 2006  (CH) .................................. 1562/06
May 29, 2007  (CH) .................................. 0846/07

(51) Int. Cl.
*F24J 2/10*  (2006.01)

(52) U.S. Cl.
USPC ........................... 126/696; 126/697; 126/710

(58) Field of Classification Search
USPC ................ 126/696, 697, 710, 711, 624, 625, 126/684
See application file for complete search history.

(56) References Cited

U.S. PATENT DOCUMENTS

| 1,661,473 A | 3/1928 | Goddard et al. |
| 3,153,789 A | 10/1964 | Ashton |
| 4,051,834 A | 10/1977 | Fletcher et al. |
| 4,149,523 A | 4/1979 | Boy-Marcotte et al. |
| 4,226,502 A | 10/1980 | Gunzler |
| 4,491,125 A | 1/1985 | Sainsbury |
| 4,543,945 A | 10/1985 | Hattan |
| 4,628,142 A | 12/1986 | Hashizume |
| 4,672,389 A | 6/1987 | Ulry |
| 5,261,390 A | 11/1993 | Lasich |
| 5,365,920 A | 11/1994 | Lechner |
| 5,660,644 A | 8/1997 | Clemens |
| 6,373,449 B1 | 4/2002 | Bokulic et al. |

(Continued)

FOREIGN PATENT DOCUMENTS

| AT | 378599B B | 8/1985 |
| CH | 00462/08 A | 2/1910 |

(Continued)

OTHER PUBLICATIONS

Mootz, Frank, "International Search Report", for PCT/CH2009/000105 as mailed Oct. 22, 2009, 12 pages.

(Continued)

*Primary Examiner* — Alfred Basichas
(74) *Attorney, Agent, or Firm* — Winstead PC

(57) ABSTRACT

Disclosed is a radiation collector comprising a pressure cell which is subdivided into a first pressure chamber and a second pressure chamber by means of the concentrator. The small pressure difference between the pressure chambers keeps the concentrator operational in a beam-concentrating form and reduces the wear on the reflective layer of the concentrator. The radiation collector further comprises adequately designed means for establishing the desired pressure in the respective pressure chamber, said means making it possible to compensate changes of the pressure chamber volume resulting from wind load, for example.

29 Claims, 8 Drawing Sheets

U.S. PATENT DOCUMENTS

| | | | |
|---|---|---|---|
| 2004/0126594 A1 | 7/2004 | Rubbia et al. | |
| 2006/0033674 A1 | 2/2006 | Essig et al. | |
| 2006/0168960 A1 | 8/2006 | Krouse | |
| 2006/0207590 A1 | 9/2006 | Levin | |
| 2009/0272375 A1 | 11/2009 | Pedretti | |
| 2010/0229850 A1* | 9/2010 | Sankrithi | 126/601 |
| 2011/0100355 A1 | 5/2011 | Pedretti | |
| 2011/0114083 A1 | 5/2011 | Pedretti | |
| 2012/0031095 A1 | 2/2012 | Pedretti | |
| 2012/0174911 A1 | 7/2012 | Pedretti | |
| 2012/0266868 A1 | 10/2012 | Pedretti | |

FOREIGN PATENT DOCUMENTS

| | | |
|---|---|---|
| CH | 2008/0462 | 3/2008 |
| DE | 117 107 A1 | 12/1975 |
| DE | 2631551 A1 | 2/1978 |
| DE | 2733915 A1 | 2/1979 |
| DE | 2738667 A1 | 3/1979 |
| DE | 3920186 A1 | 1/1991 |
| DE | 4413056 C1 | 9/1995 |
| DE | 19923141 A1 | 11/2000 |
| DE | 20214823 U1 | 2/2004 |
| DE | 20 2006 016138 U1 | 2/2007 |
| EP | 0025834 A2 | 4/1981 |
| EP | 1903155 A1 | 3/2008 |
| FR | 1319144 | 2/1963 |
| FR | 2362347 A1 | 3/1978 |
| FR | 2398982 A1 | 2/1979 |
| FR | 2497328 A1 | 7/1982 |
| FR | 2497927 | 7/1982 |
| FR | 2497927 A | 7/1982 |
| FR | 2497927 A1 | 7/1982 |
| FR | 2567995 A1 | 1/1986 |
| JP | 2003074988 A | 3/2003 |
| WO | WO-82/00366 A1 | 2/1982 |
| WO | WO-88/03635 A1 | 5/1988 |
| WO | WO-90/10182 A1 | 9/1990 |
| WO | WO-01/55651 A1 | 8/2001 |
| WO | WO-2007/051928 A2 | 5/2007 |
| WO | WO-2008/037108 A2 | 4/2008 |
| WO | WO-2009/117840 A2 | 10/2009 |
| WO | WO-2010/017594 A1 | 2/2010 |

OTHER PUBLICATIONS

Van Dooren, Marc, "International Search Report," for PCT/CH2009/000310 as mailed Jan. 21, 2011, 4 pages.

Oliveira, Casimiro, "International Search Report", for PCT/CH2009/000147 as mailed Jul. 6, 2009, 3 pages.

Oliveira, Casimiro, "International Search Report" for PCT/CH2010/000003 as mailed Jul. 22, 2010, 8 pages.

Mootz, Frank, "International Search Report", for PCT/CH2010/000313 as mailed Apr. 21, 2011, 3 pages.

Merkt, Andreas, International Search Report for PCT/CH2007/000480 as mailed Jul. 28, 2008, 6 pages.

* cited by examiner

RADIATION COLLECTOR

The present invention relates to a radiation collector according to Claim 1.

Radiation collectors or concentrators of the stated type are used among other things in solar power plants.

Until now it has not been possible to generate solar electricity in an approximately cost-covering manner by using this technology, owing to the disadvantages of photovoltaics which have not been overcome. Solar thermal power plants, in contrast, have been producing electricity on an industrial scale for some time at prices which, compared to photovoltaics, come close to currently customary commercial prices for electricity generated in a conventional manner.

In solar thermal power plants, the radiation of the sun is reflected using the concentrator through collectors and focused in a targeted manner on a location in which high temperatures arise as a result. The concentrated heat can be conducted away and used to operate thermal engines such as turbines which in turn drive the generators which generate electricity.

Three basic forms of solar thermal power plant are currently in use: dish/Stirling systems, solar tower plant systems and parabolic trough systems.

Dish/Stirling systems are equipped with parabolic mirrors which concentrate the solar light onto a focal point where a heat receiver is arranged. The mirrors are mounted such that they can be rotated about two axes, in order to made to follow the current position of the sun, and have a diameter of a few metres up to 10 m or more, with which outputs of up to 50 kW per module are achieved. A Stirling motor installed in the heat receiver converts the thermal energy directly into mechanical work, by means of which electricity is in turn generated.

At this point reference may be made to the embodiments described in U.S. Pat. No. 4,543,945 and the installed EU Distal and Eurodish systems in Spain.

U.S. Pat. No. 4,543,945 discloses in a first embodiment a structural principle of a collector with a pressure cell, consisting of two round, superposed membranes which are connected at the edges, with the upper one having s transparent configuration and the lower one being provided with a reflective layer. In the inflated state the pressure cell is lens-shaped, with both membranes being curved in a spherical manner, with the result that radiation which is incident through the transparent part is concentrated by the reflective layer in a region where the heat can be removed. In a second embodiment, a vacuum cell is used instead of a pressure cell so that the membrane with the reflective layer is brought into the spherical operating position by the ambient pressure.

The Distal I and Distal II systems (put into operation in 1992 and 1997 respectively) have concentrators which are mounted in a framework, are stretched over the framework as a distensible membrane and are held in the operating position by means of a vacuum pump. In principle, the framework forms a sealed off cavity which is spanned by the membrane—as is the case with the membrane of a drum. The membrane which forms the concentrator is sucked into the framework by the vacuum produced by the vacuum pump (or pushed into the framework from outside by the ambient pressure) and then assumes the operating position in an essentially spherical, but almost paraboloid form. Distal II has a mirror or concentrator diameter of 8.5 m.

A membrane is used with the advantage of the low weight, which in turn leads to the lower outlay for the framework on which the membrane is stretched. Compared with a conventional, heavy and expensively produced mirror, the structural outlay is noticeably lower. For systems with high outputs, a plurality of collectors (which are small in themselves) are aligned to the same heat receiver.

Although the structural outlay would be advantageously lower with the use of a (lens-shaped) pressure cell compared to the above-mentioned vacuum design of Distal II, the pressure cell has so far not found any application, as the deformability of the pressure cell and thus the concentrator, for example as a result of wind, at larger dimensions is disadvantageously of consequence. Deformations of the concentrator considerably reduce the efficiency of the system. This disadvantage is not present with a vacuum membrane, which can be inserted in a wind-protected manner in the rigid framework, as the concentrator.

Dish/Stirling systems are technically interesting, but are afflicted with disadvantages for electricity production on an industrial scale.

Solar tower plant systems have a central absorber which is mounted in an elevated manner (on the "tower") for the sunlight which is reflected to it by means of hundreds to thousands of individual mirrors, whereby the radiation energy of the sun is concentrated in the absorber by means of the many mirrors or concentrators and thus temperatures of up to 1300° C. are reached, which is favourable for the efficiency of the downstream thermal engines (generally a steam or fluid turbine power plant for electricity generation). The "Solar two" system in California has an output of several MW.

Parabolic trough plants have large numbers of collectors which have long concentrators with small transverse dimensions and thus do not have a focal point but a focal line. These linear concentrators currently have a length of from 20 m to 150 m. An absorber pipe runs in the focal line for the concentrated heat (up to almost 500° C.) and transports the latter to the power plant. Thermal oil or superheated steam for example are possibilities for the transport medium.

FR-PS 1,319,144 discloses a well or trough collector for a parabolic trough plant, which has a cylindrical pressure cell with a transparent region and with a reflective region. It is in principle conceivable with such an arrangement to heat an absorber pipe which runs through the cylindrical pressure cell along its length. A further embodiment according to the stated FR-PS has a flexible concentrator on which pressure acts and which is arranged in a pivotable manner in the pressure cell, so that the position of the sun which changes over time due to the seasons, among other things, can be taken into account. The concentrator bears with its sealing lips displaceably against the wall of the cylindrical pressure cell, whereby its pivotability is produced. The pressure cell therefore has two pressure zones which are separated by the concentrator. The pressure difference which can be achieved between the pressure zones is limited in that a "friction ecxéssive", which arises owing to the sealing lips pressing against the wall of the pressure cell is to be avoided in favour of the pivotability of the concentrator. How the necessary pressure is to be built up and maintained (there is a constant leakage air flow through the pressure cell owing to the limited sealing capacity of the sealing lips) is not the issue, as there is a "dispositif de pompage approprié non représenté".

The cylindrical configuration of such a trough collector is undesirable or impracticable with the currently demanded, above-mentioned dimensions. The extremely large area which can be affected by wind, for example, which is then formed requires a reinforcement of the cylindrical pressure cell by means of a massive framework, as is already mentioned in the stated FR-PS with regard to reinforcing "nervures annulaires" of the cylindrical body. The disclosed embodiment thereby loses the advantages mentioned at the start of the FR-PS relating to lighter, more transportable and favourable structure.

The 9 SEGS parabolic trough plants in Southern California together produce an output of approx. 350 MW; an additional power plant in Nevada should join the network in 2007 and supply over 60 MW. A further example of a parabolic trough plant is Andasol 1 in Andalusia, which is currently under construction, with a concentrator area of 510,000 m$^2$ and 50 MW output, wherein the temperature in the absorber pipes should reach approx. 400° C. The costs are estimated at several hundred million euros.

It can be recorded that roughly 40% or more of the total costs for a solar power plant are due to the collectors and that the efficiency of the power plant is decided by the quality of the concentrators.

Correspondingly, it is the object of the present invention to create a radiation collector which avoids the stated disadvantages, is light and inexpensive, and can be used for example even in the configuration as a trough collector with very large dimensions.

This object is achieved by a radiation collector with the features of Claim 1.

The fact that the pressure in the pressure chambers is maintained even when the volume of one or both of the pressure chambers is changed means that the position of the reflector which is subjected to the pressure, and therefore its function, remains unaffected, which considerably alleviates the problems of being affected by wind with the unavoidable deformations of the collector.

This applies if particularly large collectors are provided for solar tower plants, that is, can even have stretched reflectors with a large area, even if particularly large collectors are provided for parabolic trough plants, whose likewise large collectors with their outer faces are susceptible to being affected by wind (i) owing to their size and also (ii) for reasons of flow on account of their convexly rounded shape. The same likewise applies for collectors as are used for dish/Stirling systems, where the smaller dimensions lead to a lighter (and more favourable) structure and thus reduced resistance.

In a preferred embodiment, a radiation collector with a pressure cell which is at least partially formed from a flexible membrane and has a transparent region for radiation to be concentrated is provided, with a concentrator which is arranged securely in the pressure cell, has a flexible, fluid-tight membrane, has a side which faces the transparent region and reflects the radiation and a side which faces away from the radiation and is held pneumatically in the operating position which concentrates the radiation by means of the pressure prevailing on the reflective side, wherein the concentrator divides the pressure cell into a 1st pressure chamber with higher operating pressure and a 2nd pressure chamber with lower operating pressure, and wherein means are provided to generate and maintain operational pressures of predefined difference in the pressure chambers when the volume of one or both pressure chambers is altered by external influences during operation.

The fact that in this preferred embodiment the concentrator is arranged in a secure and fluid-tight manner in the pressure cell means that the first and second pressure chambers are configured to be fluid-tight, with the result that a pressure that has been built up once is maintained and that even a very small pressure difference between the two pressure chambers can be kept constant without a great outlay on regulation. The fact that the pressure difference is maintained even when the volume of a pressure chamber is changed means that the operating position of the concentrator also remains unchanged, for example even if winds affect the surface of the pressure cell and deform it, which generally results in a change in the volume of the affected pressure chamber. In other words, it is the case that the external influences which deform the pressure cells no longer adversely affect the function of the collector.

In a particularly preferred embodiment, it is possible above and beyond the object set to use a reflective membrane which acts as a concentrator and, owing to the non-existent (see above for a suitable embodiment for a solar tower plant) or low pressure difference (embodiment suitable for all power plants), is loaded comparatively little and can be configured correspondingly. Compared to conventional concentrators, lower loading means less distension of the concentrator in the operating position and thus less loading of the reflective layer which is generally brittle (for example an aluminium layer vapour-deposited onto a membrane consisting of Mylar). A substantial proportion of the micro-cracks in the reflective (aluminium) layer arising during greater distension do not occur, which improved the reflective capacity of the concentrator and thus the efficiency of the power plant. In addition, the membrane can be configured without or with few reinforcements such as e.g. fibre reinforcements and then has a substantially smoother surface, which improves the reflective capacity of the concentrator even more advantageously.

In a further, particularly preferred exemplary embodiment according to Claim 6, compressed air is applied to the pressure chambers via fluid ducts, in which the air can flow in both directions and in which fans are provided for generating pressure. This makes it possible to maintain and keep constant the pressure in the associated pressure chamber by means of the constant speed of the fan even with a duct which is open with respect to the outside (or another pressure level). The duct which is open with respect to the outside in turn ensures that in the event of a sudden reduction in volume of the pressure chamber, for example as a result of a gust of wind, a corresponding part of the fluid caught in the pressure chamber can escape to the outside, whereas the pressure only drops below the setpoint value for a very short time or not at all thanks to the fan which continues to rotate. The same applies in the event of an increase in the volume of the pressure chamber, where, given the corresponding layout by the person skilled in the art, enough air can be provided by the fan to maintain the setpoint pressure constantly.

Additional embodiments of the present invention are described in the dependent claims.

The invention is explained in more detail below using the figures.

In the figures,

FIG. 1 schematically shows a cross section of a radiation collector according to the invention using the example of a Stirling system FIG. 2 shows a further embodiment of the collector of FIG. 1 using the example of a trough collector, FIG. 3 shows a view of the collector of FIG. 2

Figure 1:
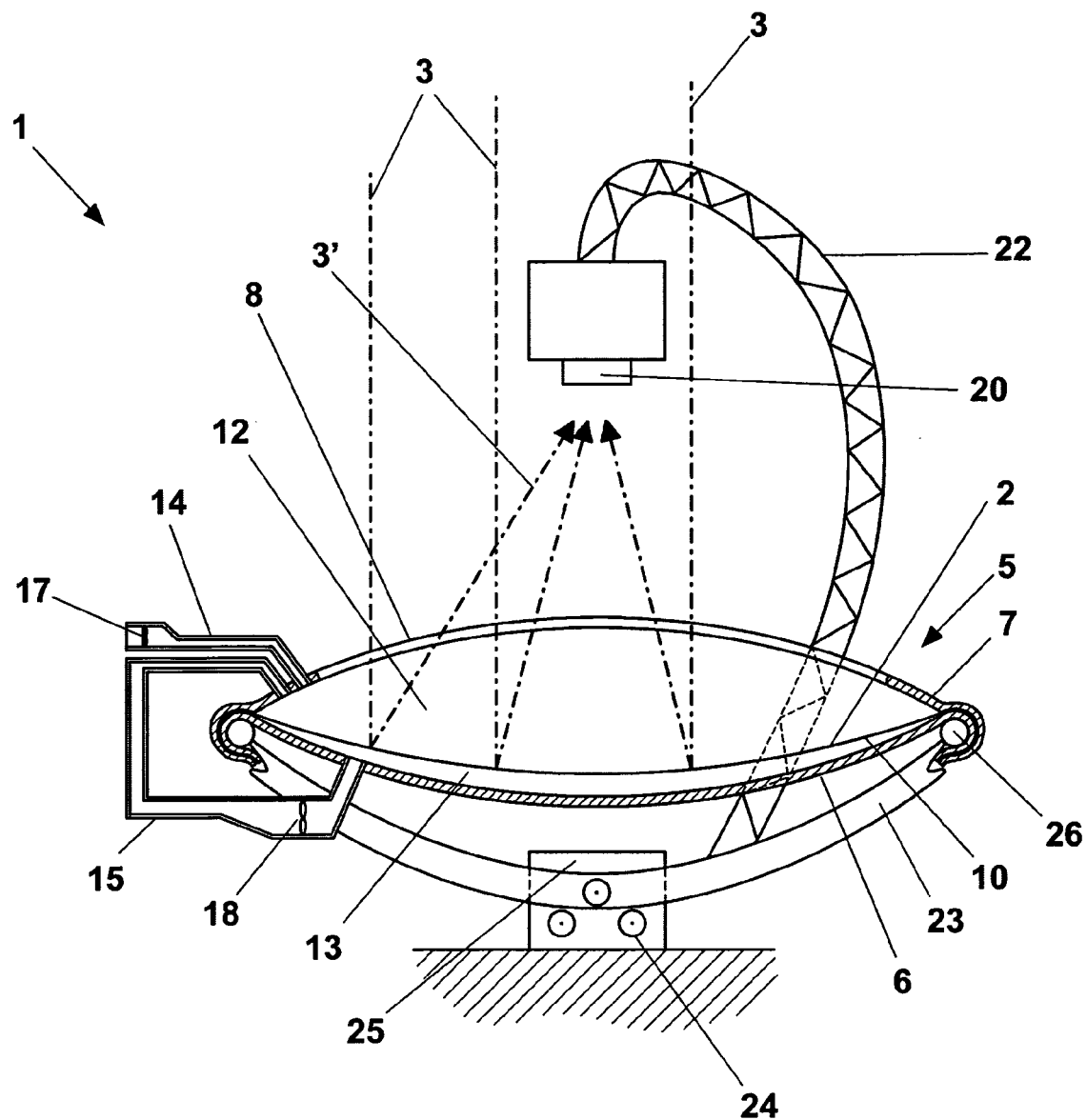
FIG. 1 shows a radiation collector 1 in cross section, which is suitable for a dish/Stirling system, for example, and is referred to below as simply "collector 1".

The collector 1 has a concentrator 2 which is configured as a fluid-tight membrane consisting of flexible material, for example Mylar. A side 4, which reflects radiation 3 (in this case solar radiation), of the concentrator 2 has for example a vapour-deposited or laminated aluminium layer for this purpose. Any suitable material which has the required reflective properties can be used. The side of the concentrator 2 which faces away from the radiation is designated 10, the radiation which is reflected by the reflective side 4 is designated 3'.

The concentrator 2 is situated in a securely arranged manner in a pressure cell 5 formed from an at least partially flexible membrane. In the embodiment shown, the pressure cell has a contour, which is lens-shaped during operation 5 with a round outline, and consists of a lower flexible membrane face 6 and an upper flexible membrane face 7, which has a transparent region 8 for radiation 3 to be concentrated. The concentrator runs between the two membrane faces 6, 7 to the edge zone of the pressure cell 5, with the first pressure chamber 12 having a convex shape and the second pressure chamber 13 having a concave shape due to the provided pressure distribution.

The membranes 6, 7 consist of PVC, PU or silicone-coated textile fabric such as polyester fabric or fibreglass fabric or another suitable material. The above-mentioned components can also be combined in a suitable manner. Textile fabrics of the stated type are for example known under the names Précontraint® 1002/1202/1302 from FERRARI or ATEX 3000 from Interglass.

ETFE (ethylene tetrafluoroethylene) or Mylar® is preferably used as the material for the transparent region 8 or for the upper flexible membrane 7.

ETFE foils with a thickness of between 100 and 200 microns are suitable in principle. ETFE is very translucent and very resistant to UV radiation and weathering. High-strength, transparent polyethylene foils or other transparent materials are likewise suitable. The thickness of the membrane 6, 7 can be minimized if it is spanned with a wide-meshed, thin steel or plastic web which in the operating position dissipates the loading owing to the fluid pressure prevailing in the pressure cell 5.

The concentrator 2 divides the pressure cell 5 into a first pressure chamber 12 with higher operating pressure and a second pressure chamber 13 with lower operating pressure. The concentrator 2 is held pneumatically in the operating position which concentrates radiation, as shown in the Figure, by this pressure difference.

A first fluid duct 14 opens into the first pressure chamber 12, a second fluid channel 15 opens into the second pressure chamber 13; wherein a fluid, in this case air, can flow in both directions through both fluid ducts in order to maintain a setpoint operating pressure. Each fluid duct 14, 15 is provided with a fluid pump which is preferably configured as a fan 17, 18.

When the fans 17, 18 are operated as intended, pressure builds up in the first pressure chamber 12, with at the same time air getting through the duct 15 into the second pressure chamber. The fan 17 is actuated by means of a suitable regulation system which has for example pressure sensors in such a manner that the pressure in the first pressure chamber 12 reaches the setpoint value which is in a range from 1 to 5 mbar, preferably 2 to 5 mbar and particularly preferably in a range from 3 to 4 mbar. The fan 18 is actuated by a second regulation system which can likewise have pressure sensors in such a manner that the pressure in the second pressure chamber 13 is lower, with the pressure difference which exists with respect to the first pressure chamber 12 being less than 0.5 mbar, preferably in a range from 0.05 to 0.2 mbar, and particularly preferably in the range from 0.05 to 0.1 mbar. The regulation devices and the drive of the fans can be easily determined and designed by the person skilled in the art and are therefore omitted in order to keep the figure clear and also not described in any more detail.

These pressure values mean that on the one hand although the pressure cell 5 which is under setpoint pressure is rigid enough to be used serviceably in a power plant, the strength of the above-mentioned membrane materials for collectors with 8 to 15 m diameters is not exceeded by the loading (which anyway reaches approx. 750 kg/m at 5 mbar pressure, that is, 50 kg/m).

On the other hand, the predefined pressure difference which holds the concentrator 2 in the operating position is significantly smaller, with the result that a thinner membrane can be used and at the same time its distension is smaller, which in turn preserves the reflective coating or makes possible a better quality of coating in the first place, and thus contributes, as described above, to noticeably increasing the efficiency of the collector and thus of the power plant. In addition, small variations in the setpoint pressure difference (in this case by means of a suitable change in the fan speed) can be used to adjust very precisely the curvature of the concentrator 2 and thus its focal point, so that even small changes in the distension of the concentrator membrane as a result of temperature, moisture, ageing, etc. can be compensated simply, rapidly and precisely.

The fluid ducts 14, 15 together with the fans 17, 18 form means for generating and further maintaining a predetermined pressure difference in a serviceable manner in the pressure chambers 12, 13 if the volume of one or both pressure chambers 12, 13 is changed by external influences during operation:

Although, as mentioned above, the pressure cell 5 which is under setpoint pressure has a certain rigidity, it does not behave in a stiff manner under for example wind pressure, but flexibly in accordance with the nature of things, with the result that the volume of the pressure cell 5 and thus one or both pressure chambers 12, 13 can change. A reduction of for example the second pressure chamber 13 would in this case have to lead to an increase in pressure and ultimately to a change in the position of the concentrator. In other words, it is the case that the low pressure difference, which is advantageous with regard to the achievable properties of the concentrator 2, is disadvantageous in this situation and leads to a labile stabilization of the position of the concentrator 2, which can in turn reduce the efficiency of the collector. The arrangement shown of the fluid duct 15 with the fan 18 however prevents this negative effect.

When wind affects the lower flexible membrane 6, air is forced out of the second pressure chamber 13 and flows (in the effective direction of the fan) into the first pressure chamber 12. Suitable actuation of the fan 18 means that the setpoint pressure difference is maintained. When the original volume is restored in the pressure chamber 13, air flows correspondingly back counter to the effective direction of the fan. Even if there are brief fluctuations in the pressure difference owing to the effect of wind, these turn out to be much smaller and in particular attenuated than would be possible without the fluid duct 15 which functions in the manner shown. The result is that a solar power plant can maintain for longer the operation of collectors consisting of flexible material during unfavourable weather with the present configuration.

The fan 18 constantly maintains the pressure difference without being disrupted by external influences. As there is an open connection by means of the second fluid duct 15 between the pressure chambers 12 and 13, no impermissible equalization of pressure would take place without the fan 18 running. In the "static", that is, undisrupted operating state, the air column which is present in the fluid duct 15 stays still with the fan 18 running, the setpoint pressure difference continues unchanged.

The fluid duct 14, which is connected to the outside, means that the setpoint pressure in the first pressure chamber 12 is maintained or regulated to the setpoint value when the upper flexible membrane 17 is deformed, for example by the effect of wind, in the same manner by means of the fan 17.

This open configuration of the fluid duct 14 (and of the duct 15) with a fluid pump configured as a fan which runs constantly forms at the same time an overpressure equalization for the first pressure chamber 12 (and the second pressure chamber 13): Fluctuating daily temperatures and fluctuating solar radiation mean that fluctuating temperatures prevail in the interior of the pressure cell 5, in particular in the first pressure chamber 12, which temperature fluctuations could lead to pressure variations in the case of a closed pressure cell 5, which pressure variations damage the membranes 6, 7 or the concentrator 2. With a constantly open connection to the outside, this risk is eliminated, overpressure can also escape counter to the running fan 17 (or also 18). In addition, in the event of cooling in the first pressure chamber 12, the air necessary for the setpoint pressure is conveyed into it as required owing to the constantly running fan 17. In other words, it is the case that the air flows in both directions in the fluid ducts, depending on what is necessary for the setpoint operating pressure to prevail in the associated pressure chamber 12, 13.

In a further embodiment, an opening in the concentrator 2 itself is provided which has a fan (or another fluid pump which has the same function), instead of a fluid duct 15. The opening is then advantageously arranged in the shadow of the heat receiver 20 (see below).

Depending on the way the concentrator 2 is cut, it assumes a spherical or approximately paraboloid shape under operating pressure or setpoint differential pressure and is situated in the operating position so that the incident solar rays 5 are reflected through the pressure-induced spherical or paraboloid configuration into a focal point region, in which a heat receiver 20 is arranged in turn.

The concentrator 2, which consists of flexible material, preferably a membrane, can have a single-piece configuration or be joined together from a plurality of sections. In the case of the single-piece configuration, a certain distension of the concentrator material, which is resistant to tensile forces per se, will take place under the setpoint pressure difference so that a spherical operating position, that is, that of a spherical calotte is produced. If a plurality of sections are used, the operating position can be predefined by matching the cut of the various sections to the spherical or paraboloid shape.

Connected to the heat receiver 20 is (in the case of the dish/Stirling system) a Stirling engine 21, with heat receiver 20 and engine 21 being suspended together on an arm 22, which is in turn securely supported on a frame part 23 of the collector 1 in such a manner that, when the collector 1 pivots in order to follow the position of the sun, the heat receiver 20 constantly remains in the focal point region of the concentrator 2.

The frame part 23, which has a bent configuration and on which the pressure cell 5 is suspended along its edge region, be configured as a double-T support so that rollers 24' of a pivot drive 25 can pivot the collector 1 suitably in order to follow the position of the sun. The configuration of suitable pivot drives for solar collectors in two directions is known to the person skilled in the art, for example from the Dish and Eurodish systems, so that in the present case we can remain with the schematic diagram for pivoting in only one direction.

Particularly preferably the frame consists essentially of concrete or prefabricated concrete elements, as is described in more detail below.

The superposed and interconnected edges of the lower flexible membrane 6 and of the upper flexible membrane 7 and of the collector 2 are wrapped around a support ring 26 and fixed to it in a suitable manner which can be carried out by the person skilled in the art. The support ring 26 is likewise fixed in a conventional manner to the frame part 23.

As a result, a concentrator 2 is made available, which is substantially lighter compared to conventional mirrors, which allows the structure of the collector 1 as such to be considerably simplified and thus configured more favourably.

Figure 2:
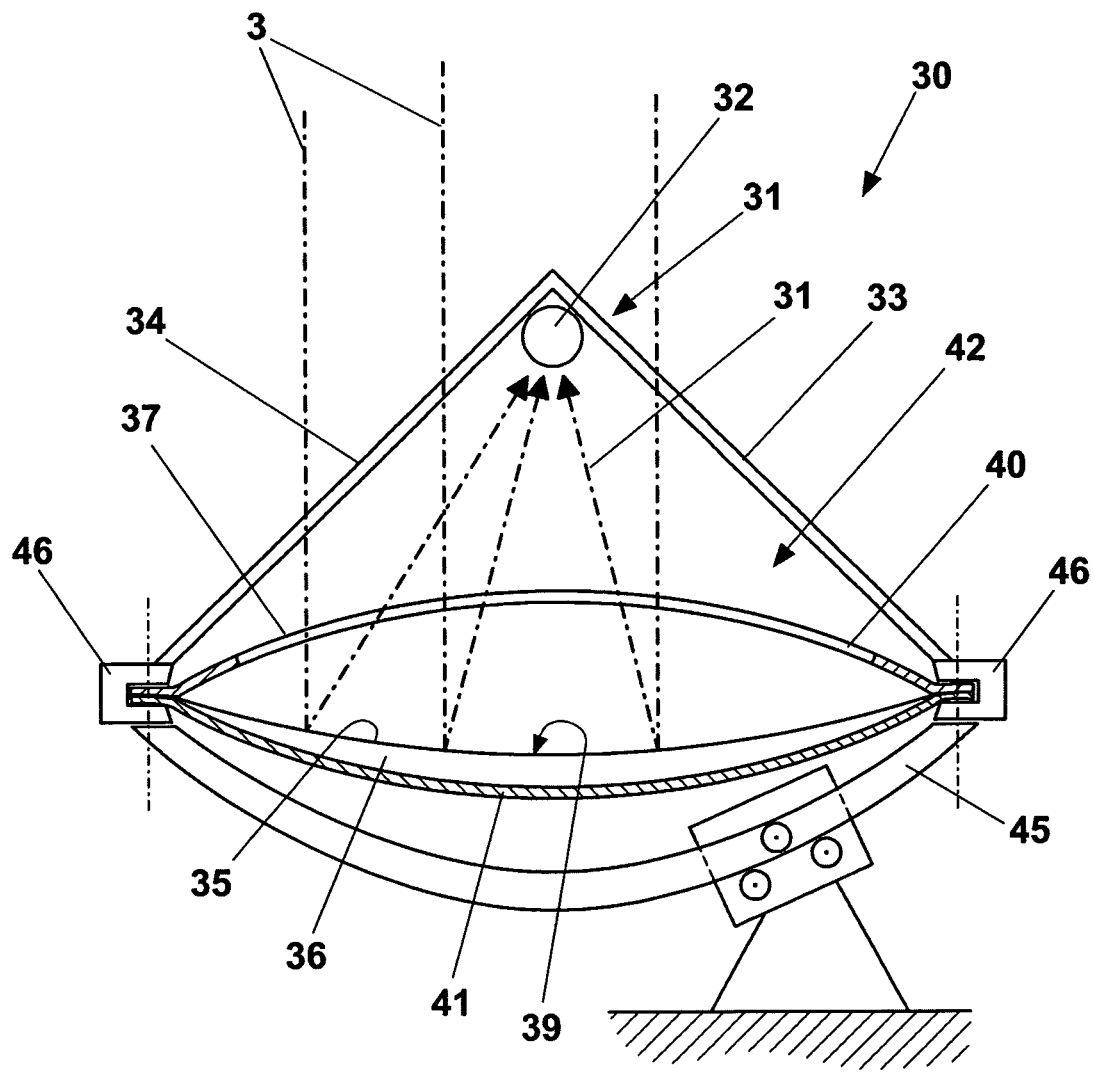

FIG. 2 shows the cross section of a well or trough collector 30 according to the invention. In a focal line region 31 which is formed by the reflected rays 5', there is an absorber pipe 32 for the concentrated radiation energy, which is suspended on a rack with supports 33 and 34.

A concentrator 35 with an essentially rectangular configuration is held in an operational position by the pressure difference, with the setpoint pressure in the first pressure chamber 36 being greater than in the second pressure chamber 37. In order to make the figure clearer, the means for generating and maintaining a predefined pressure difference in an operational manner in the pressure chambers 36, 37 are not shown, as they are configured in the same manner as shown in FIG. 1 (see ducts 14, 15 and fans 17, 18).

The pressure difference means that the concentrator 35 of essentially rectangular configuration has a cross section which is arched in a spherical or approximately paraboloid manner, with surface lines which run in a longitudinal parallel manner, so that the reflective layer 39 which is applied to it reflects the rays 3 in such a manner that they are concentrated in and along the focal line region 31. The concentrator 35 [lacuna]

The radiation-permeable (or: considering the material used, as radiation-permeable as possible) upper flexible membrane 40 together with the lower flexible membrane 41 forms a cushion-shaped, rectangular pressure cell 42 in which the concentrator 35 is arranged in a secure and fluid-tight manner and runs between the upper and lower membranes up to the edge zone of the collector. The pressure cell 42 is divided by the concentrator 35 into a first, convex shaped pressure chamber and a second, concave shaped pressure chamber.

The pressure cell 42 is mounted on a rack 45 by means of a frame 46, for example by means of a screw-fastening (not shown in order to make the figure clearer), which fixes the superposed edges of the concentrator 35 and of the flexible membranes 40, 41.

The basic structure, including the necessary mobility of a well or trough collector 30, is known to the person skilled in the art, for example from the SEGS system in California.

Owing to the large dimensions mentioned at the start (lengths of up to 150 m or more), the reduction in weight and costs achieved by the collector 30 according to the invention is significant. It can roughly be estimated that the weight can be reduced from 30 kg/m$^2$ per m$^2$ of concentrator area to 10 kg/m², with the corresponding cost reduction being 50%, that is, may fall from 60 $/m² currently to 30 $/m². These ratios also apply to the other embodiments according to the present invention.

Figure 3:
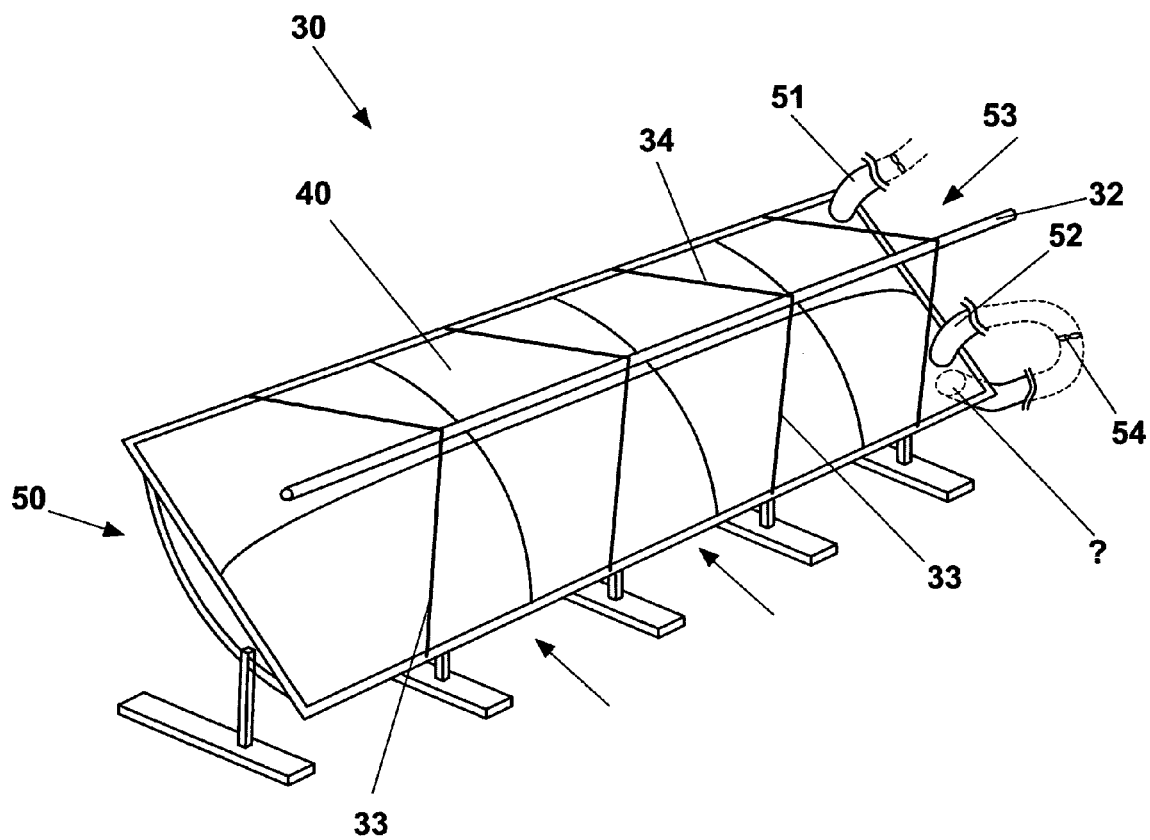

FIG. 3 shows a view of the well or trough collector 30 laterally from above in order to illustrate the ratios. The pressure zone, consisting of the pressure chambers 36, 37 (FIG. 2) has correspondingly the shape of a long, rectangular cushion.

In contrast it is also possible by corresponding cutting to configure a concentrator which has half-moon-shaped side walls on the sides 62, so that the overpressure zone has the shape of a cylindrical section with approximately parallel side walls. The cushion shape is however advantageous for still directing sunlight which is obliquely incident early in the morning or late towards evening and is incident into the collector 30 on the sides 50 at least partially into the focal line region 31 (FIG. 2).

A fluid duct 51, which corresponds functionally to the duct 14 (FIG. 1), is indicated in the figure, likewise a fluid duct 52, which corresponds functionally to the duct 15 (FIG. 1). Likewise indicated are fluid pumps 53, 54 which are configured as fans and have the same function as the fans 17, 18 of FIG. 1. Reference is made accordingly to the explanation of FIG. 1 for the functioning.

Figure 4:
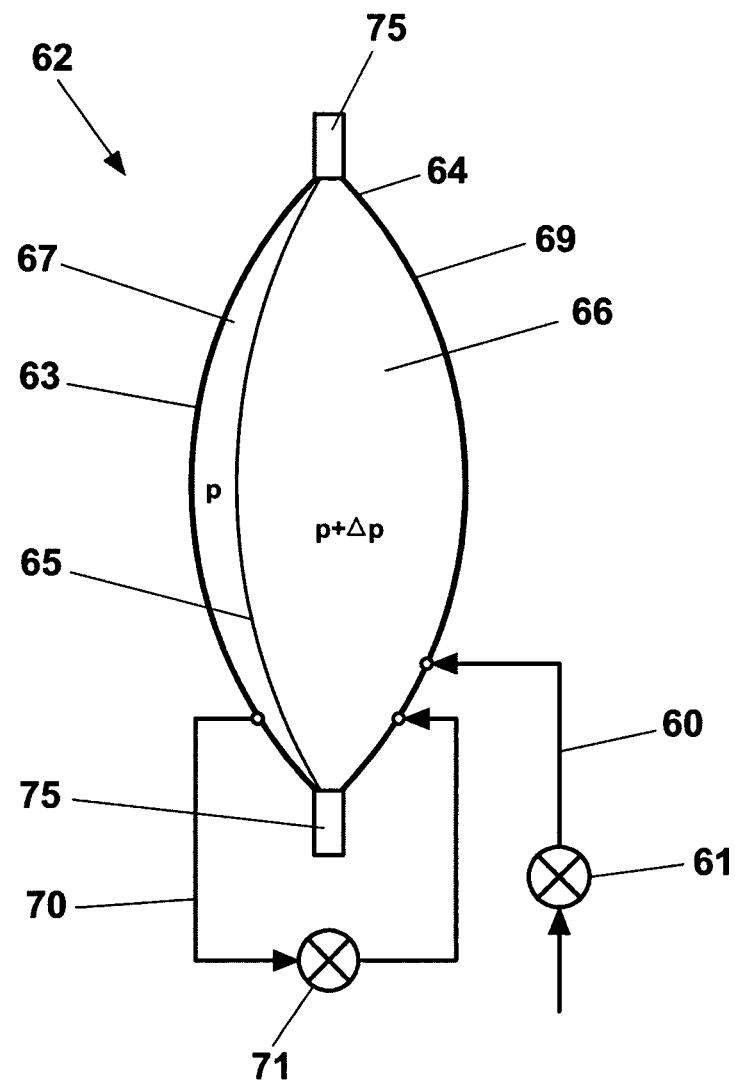
FIG. 4 shows the diagram of a collector according to the invention with an arrangement for supplying pressure fluid, FIG. 5 schematically shows a cross section of a further embodiment of the radiation collector according to the invention, suitable for the configuration of an approximately parabolically curved concentrator

FIG. 4 shows a cross section through a pressure cell 5 or 42 with schematically drawn fluid ducts and fluid pumps which ensure the function according to the invention, in order to illustrate the ratios.

A first fluid pump 61 which is arranged in the fluid duct 60 generates fluid pressure in the pressure cell 62, consisting of a lower flexible membrane 63 and an upper flexible membrane 64 with a transparent region 69. The pressure cell 62 is subdivided by the concentrator 65 into a first pressure chamber 66 and a second pressure chamber 67. The pressure chambers 66, 67 are connected to each other by means of a fluid duct 70, with a second fluid pump 71 being situated in this duct, which pump is configured to pump a fluid from the pressure chamber 67 into the pressure chamber 66.

The pump action of the fluid pump 71 is set during operation compared to that of the fluid pump 70 in such a manner that a fluid pressure $p+\Delta p$ in the pressure chamber 66 and a fluid pressure p in the pressure chamber 67 is built up and maintained. The pressure difference $\Delta p$ acts on the concentrator 65 and holds it in the operating position which concentrates radiation.

The fluid can flow in both directions in both ducts 60, 70 so that a pressure equalization owing to deformations of the pressure chambers 66, 67 or temperature fluctuations (the pressure chamber 66 is exposed to the sun, the pressure chamber 67 generally not) can always take place. The fluid pumps, preferably fans, are actuated correspondingly.

The figure further shows a frame 75, in which the pressure cell 62 is clamped. This frame (likewise the frame 20, FIG. 1 and the frame 46, FIG. 2) consists preferably and surprisingly of a concrete structure. With the dimensions mentioned in the description of FIG. 2 of a trough collector, a steel structure for the frame with sufficient rigidity would be disadvantageous in terms of material costs and weight compared to a frame structure of for example prefabricated concrete elements. Solar power plants are preferably erected in a desert or other remote region. Material transporting, in this case for a steel frame of the required size, is expensive. A concrete structure can be produced on site virtually everywhere.

Figure 5:
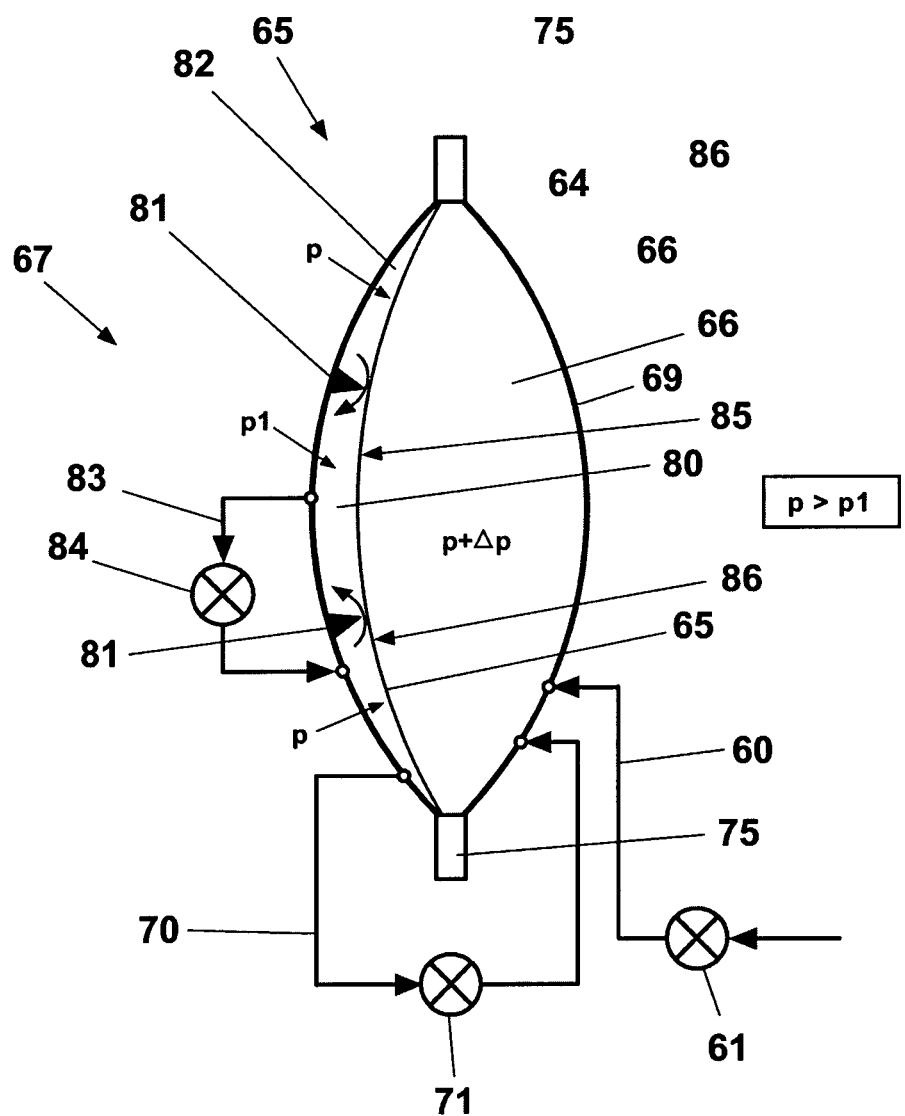

FIG. 5 shows a further embodiment of the radiation collector according to the invention in the schematic representation of the collector of FIG. 4. The same elements are designated the same reference numbers.

The second pressure chamber 67 has a centrally located core zone 80, which is separated from the other regions 82 of the first pressure chamber 67 by means which are configured as a sealing arrangement 81. Using these means, a pneumatic pressure can be maintained operationally in the core zone 80, which pressure is less than the pressure in the other regions 82 of the second pressure chamber 67. The core zone 80 is connected to the other regions 82 by means of a fluid duct 83, with the fluid duct 82 having a fluid pump 84. The fluid pump 84 is in turn preferably configured as a fan, which is arranged in an open duct 83 and generates a pressure gradient between the core zone 80 and the other regions 82 in such a manner that in the core zone a pressure p1 prevails which is smaller than the pressure p in the other regions 82, with the pressure p, as mentioned, being smaller by $\Delta p$ than the pressure in the first pressure chamber 66. In other words it is the case that fluid can flow out of the core zone in order to reduce the pneumatic pressure in the latter.

The pressure p1 has the effect that the concentrator 65 is somewhat more curved in its centre during operation than in its outer edge regions, with the result that it is curved more in a parabolic than spherical manner, the radiation is correspondingly concentrated in an improved manner and thus the efficiency of the collector is increased once again.

The core zone is located therefore in the area of the concentrator 65 in which its most pronounced curvature is desired. In the case of the round collector in its centre, in the case of the trough collector along its central surface line.

In this embodiment, too, the person skilled in the art can design the necessary pressure regulation by means of the fan of the fluid pump 84 in a conventional manner. In this case too, a pressure equalization can take place (partially counter to the fans) in the event of external influences, as is mentioned in the description of FIGS. 1 and 4.

The sealing arrangement preferably has a sealing lip, which interacts operationally with the concentrator 65, that is, effects sufficient sealing between the core zone 80 and the other regions 82, without impairing the concentrator 65 for example mechanically.

Particularly preferred in this regard is a sealing arrangement whose sealing lip has a small distance from the concentrator during operation, so that any mechanical impairment is excluded. A semi-permeable foam strip can be provided as a contact element with the concentrator 65 to likewise prevent a mechanical impairment. In the case of the distance of the sealing lip or of the semi-permeable foam strip, however, the air gap or the foam are to be dimensioned such that the quantity of fluid flowing from the surrounding regions into the core zone is smaller than the quantity of fluid which can be conveyed through the fluid pump 84.

Figure 6:
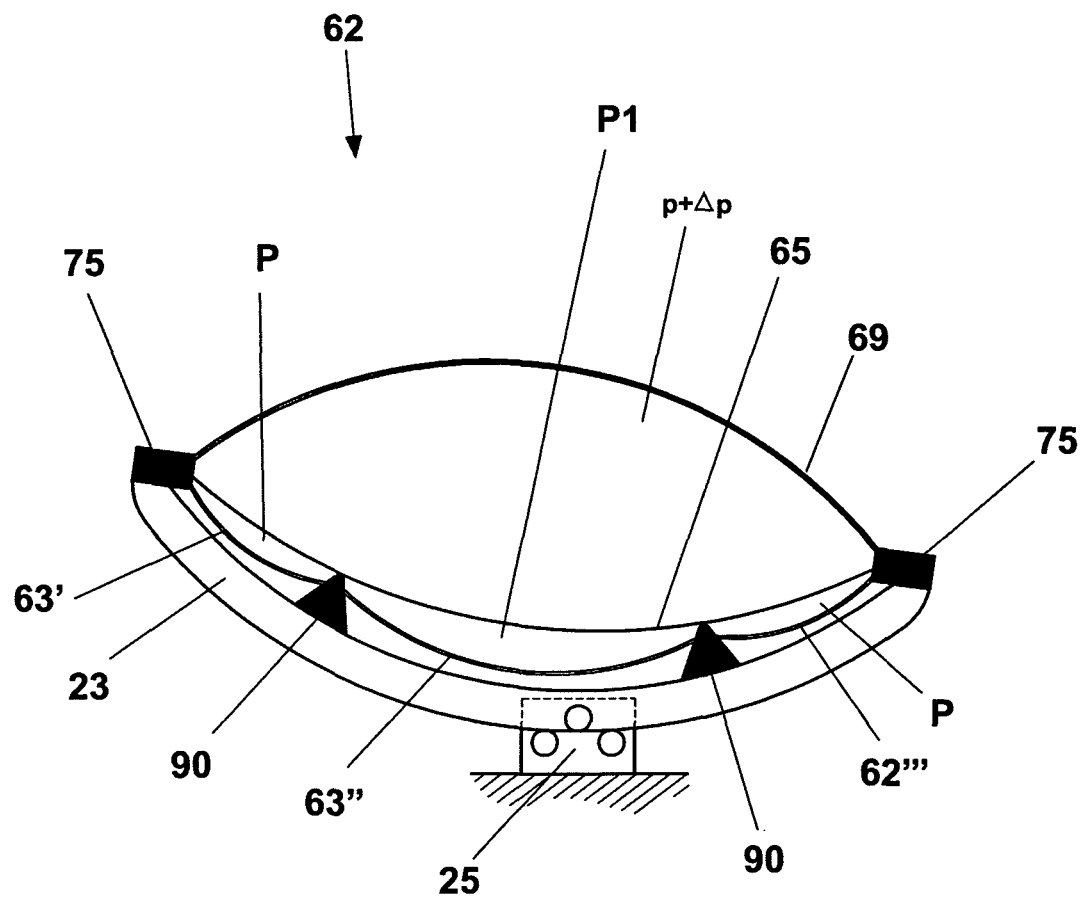
FIG. 6 shows a particular embodiment of the collector of FIG. 5

FIG. 6 shows a further embodiment of the radiation collector of FIG. 5 according to the invention. The same elements are in turn given the same reference numbers.

The fluid ducts 60, 70 (FIG. 5) have been omitted in order to make the figure clearer.

A particular embodiment of the means for maintaining a pneumatic pressure operationally in the core zone 80 is shown in more detail, which pressure is smaller than the pressure in the other regions 82 of the second pressure chamber 67. A sealing arrangement 90 is supported on a frame part 23 (see also FIG. 1), which sealing arrangement is connected to the sections 63', 63", 63''' of the lower flexible membrane of the pressure cell 62 in a fluid-tight manner. The elements of the seal 90 which interact with the concentrator 65 are preferably configured to be the same, as is mentioned in the description of FIG. 5, and have for example sealing lips or semi-permeable foam strips.

The fact that the sealing arrangement 90 is not supported on the lower flexible membrane 63 (FIG. 5) but on the support part 23 means that an improved stability of the pressure cell 62 is produced.

The embodiments described using the figures have a concentrator to which pressure is applied, thus different pressures in the corresponding pressure chambers. If collectors are used for solar tower plants, a curvature of the concentrator is not strictly necessary, as the tower is situated at a comparatively great distance. Even or flat mirrors are well used in such power plants.

If the pressure in the 1st and 2nd pressure chambers is kept at the same level in the embodiments shown in the figures, the concentrator, that is, in this case the flexible, reflective reflector, assumes an even position. In this case a membrane which is filigreed per se, that is, vulnerable, with good reflective properties can be used as the reflector, as the latter is protected by the pressure cell. Furthermore, the reflector remains essentially in its position if the pressure cell is deformed on account of for example the effect of wind, since the overflow region which connects the two pressure chambers ensures spontaneous pressure equalization. The overflow region is advantageously configured as a duct 15 (FIG. 1); it can however also be designed as an opening in the reflector.

Figure 7:
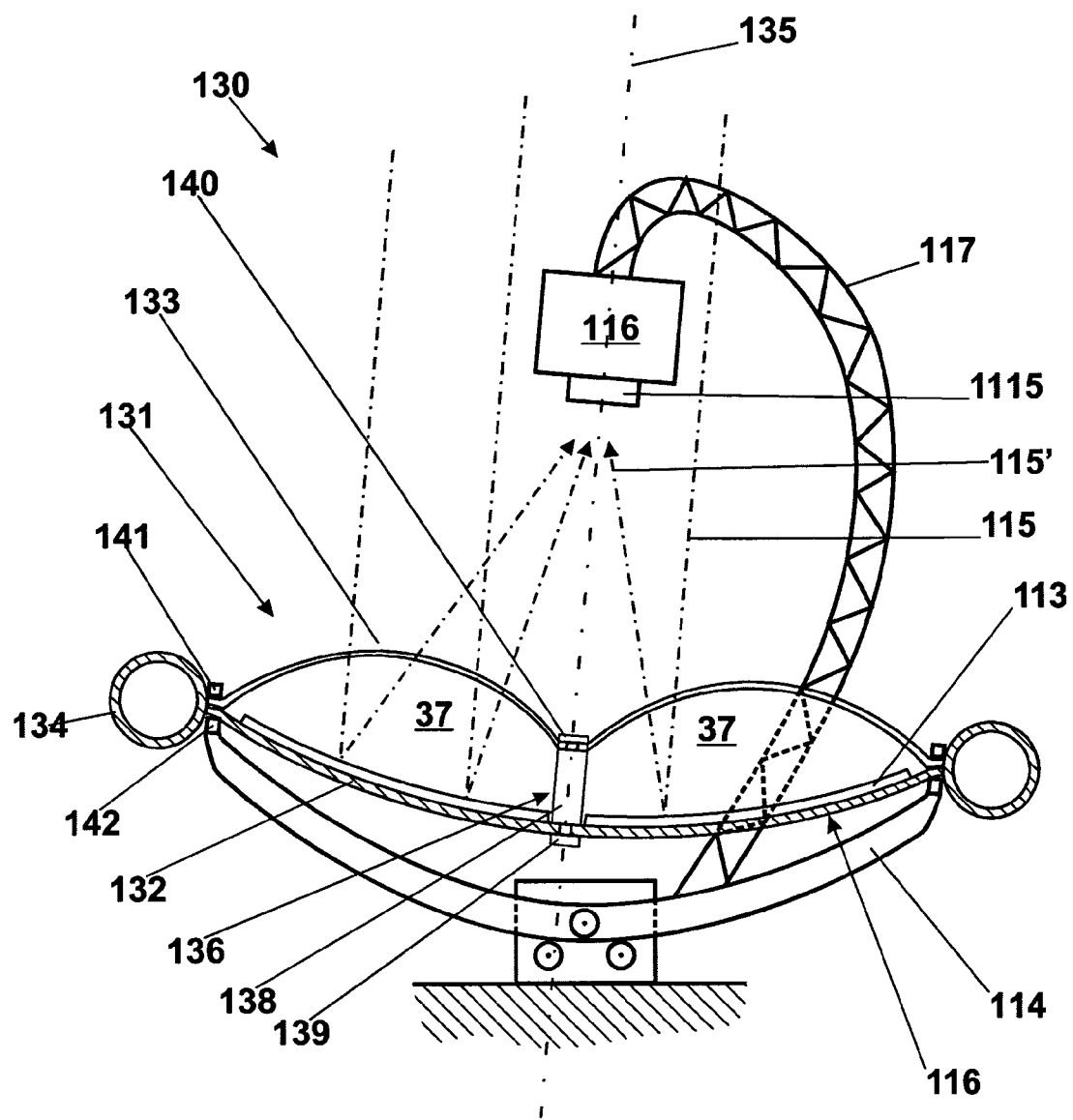
FIG. 7 shows a further embodiment of a collector according to the invention with peripheral support rings
Figure 8:
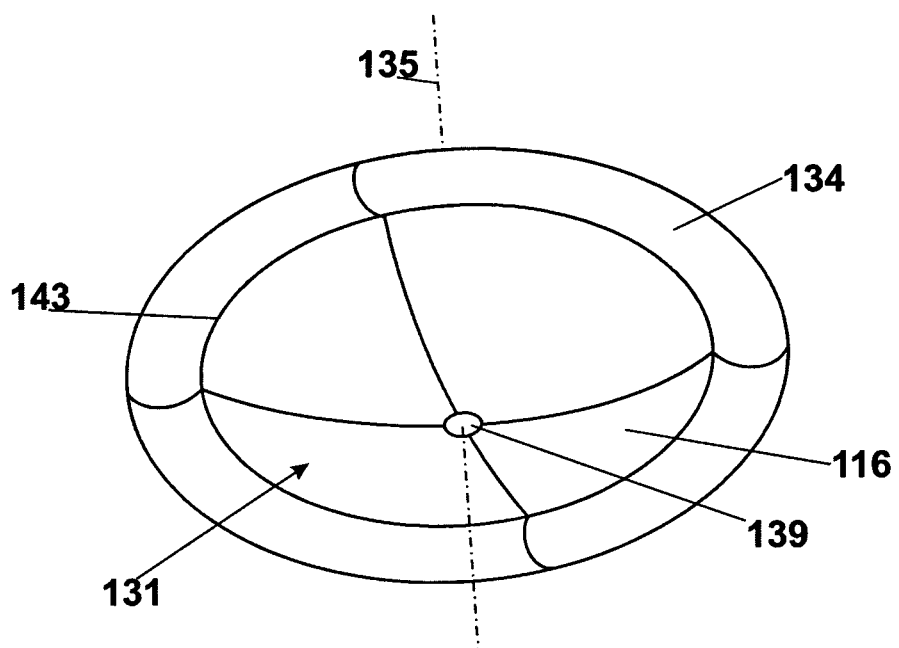
FIG. 8 shows the pressure cell of the collector according to FIG. 7 in a view from below.
Figure 9:
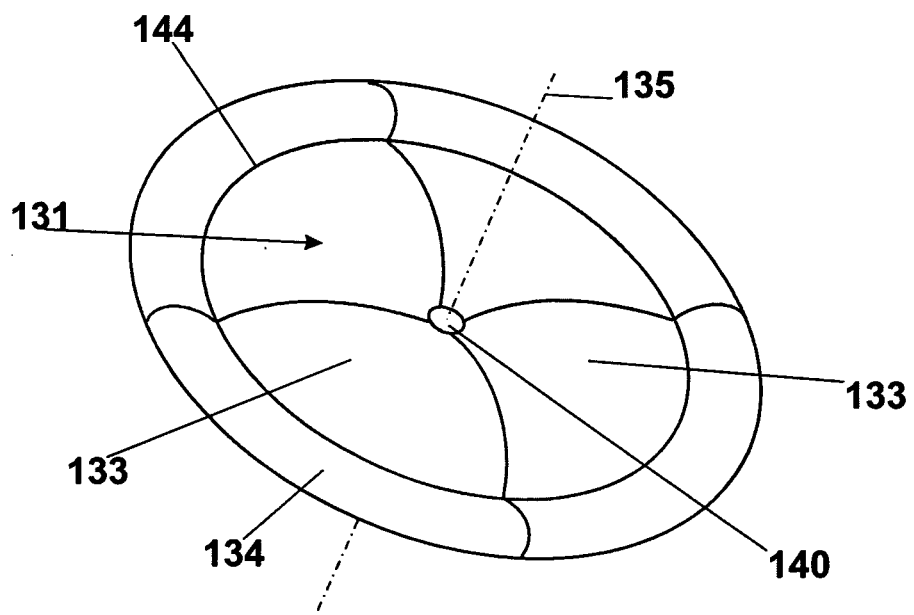
FIG. 9 shows the pressure cell of the collector according to FIG. 7 in a view from above.

A further embodiment according to the FIGS. 7 to 9 is likewise suitable for resisting disruptive wind effects or allowing a correspondingly less expensive suspension for a pressure cell.

Apart from that, each overpressure zone can be segmented in order to improve the mechanical stability, in particular if a configuration according to FIG. 7 in trough form is used.

The embodiment described below, in particular with a support ring 134, can be configured as shown in FIGS. 7 to 9 or in combination with an embodiment according to FIGS. 1 to 6. In other words, it is the case that for example the support ring 134 can be arranged on all the embodiments with the corresponding benefit. A similar situation applies for segmented pressure chambers or an annular configuration of a pressure chamber; such features can be combined freely according to necessity by the person skilled in the art, they are not restricted to the embodiments shown.

FIG. 7 now shows a preferred embodiment of the invention in the shape of a collector 130, which is essentially built the same as the collector of the preceding figures, but can also be configured in such a manner that the reflective layer is provided on its inner side of an outer wall of the pressure cell, as is shown in FIG. 7. The configuration of the pressure cell 131 is modified, consisting of a modified pressure chamber wall 132 and a modified pressure chamber wall 133, with the pressure cell 131 being fixed to a specially configured support ring 134.

The pressure cell 131 which is configured rotationally symmetrically in the operating position in this case has the axis of symmetry 135 (as mentioned, the pressure cell could however be configured differently, for example in a trough-shaped manner). The pressure chamber wall 133 is drawn in against the pressure chamber wall 132 at the site of the axis of symmetry 135 and fixed to the said wall by means of a spacer 136 so that an overpressure zone in the form of an annular chamber 137 is produced.

The spacer 136 consists preferably of a cylinder 138 with bolts projecting on both sides, which project through an opening both in the wall 132 and in the pressure chamber wall 133 and are connected at the end with a closure piece 139, 410 in such a manner that the respective sections of the wall or of the concentrator 132 and the pressure chamber wall 133 in the configuration shown in the figure are fixed in a fluid-tight manner between cylinder 138 and closure piece 139, 140.

An advantage of this arrangement consists in the lower loading of the concentrator 133 or of the pressure chamber wall 134 owing to the pressure loading, which allows a concentrator 133 with a larger reflective area or makes possible a weaker dimensioning. The loss of reflective area is insignificant compared to these advantages.

The peripheral support ring 134 can likewise be configured as an inflatable structure; the concentrator unit 131 is then securely connected to the support ring 134 by means of clamping rings 141 and 142, with the lower clamping ring 142 which is securely connected to the frame part 114 assuming the function of an abutment which bears the rigid arrangement 131, 134 consisting of the concentrator unit 131 and support ring 134. The upper clamping ring 142 is used for fixing the arrangement 131, 134 to the frame part 113.

The two clamping rings 141, 142 are preferably screwed to each other, with the screws or the corresponding holes in the superposed edges of the concentrator 132 of the pressure chamber wall 133 and in a suitable inner flange of the support ring 134 easily being designed by the person skilled in the art and therefore not being shown in order to make the figure clearer.

The support ring 134 which is provided with an adequate level of internal pressure (which the person skilled in the art can easily measure) absorbs the essential part of the radial, inwardly directed forces which exist due to the pressure in the annular chamber 137, so that the clamping rings 141, 142 can be dimensioned to be correspondingly light.

The pneumatic configuration of the support ring 134 is not tied to the annular chamber structure of the concentrator unit 131. It can also replace the support ring 120 (FIG. 1). Like other elements of the collector which are described in the present document, such elements are freely combinable without departing from the scope of the invention.

FIG. 8 shows a spatial view of the concentrator unit 131 of FIG. 7 from below, while FIG. 9 shows a view from above.

The figures illustrate the comparative dimensions of pressure cell 131 and pneumatic support ring 134. A trough 143 shows the place where the arrangement 131, 134 can be placed on a clamping ring 142 and fixed to it.

FIG. 9 further shows an upper trough 144 for the clamping ring 142, the closure piece 140 and the axis of symmetry 135, with the annular structure of the overpressure zone 137 (FIG. 8) being clearly apparent.

As mentioned, the arrangement 131, 134 has enough rigidity to be used in a light frame of a collector 120 and to withstand the usual wind strengths during use.

The invention claimed is:

1. A radiation collector comprising:
   a pressure cell at least partially formed from a first flexible membrane and comprising a transparent region;
   a concentrator fixed within the pressure cell, the concentrator comprising a second flexible membrane comprising a first side facing the transparent region and a second side facing away from the transparent region;
   wherein the concentrator is disposed between a first pressure chamber and a second pressure chamber formed within the pressure cell;
   wherein the first pressure chamber and the second pressure chamber are fluidly coupled to an exterior environment; and
   wherein, responsive to deformations caused by external influences of at least one of the first pressure chamber and the second pressure chamber, a predefined pressure range within the first pressure chamber and the second pressure chamber is maintained.

2. The radiation collector according to claim 1, comprising an overflow region fluidly connecting the first pressure chamber and the second pressure chamber.

3. The radiation collector according to claim 1, wherein:
the concentrator is held pneumatically in an operating position via pressure prevailing on the first side;
the first pressure chamber comprises a higher operating pressure than the second pressure chamber; and
the first pressure chamber and the second pressure chamber are maintained at a predefined pressure difference when a volume of at least one of the first pressure chamber and the second pressure chamber is altered by external influences during operation.

4. The radiation collector according to claim 3, wherein the predefined pressure difference is in a range from approximately 0.05 mbar to approximately 0.2 mbar.

5. The radiation collector according to claim 3, wherein the operating pressure in the first pressure chamber is in a range from approximately 1 mbar to approximately 5 mbar.

6. The radiation collector according to claim 3, wherein:
the pressure cell comprises an upper flexible membrane face and a lower flexible membrane face, the upper flexible membrane face and the lower flexible membrane face together define a lens-shaped contour with a round outline;
the upper flexible membrane face is transparent;
the concentrator is arranged between the upper flexible membrane face and the lower flexible membrane face in such a manner that, during operation, the first pressure chamber is convex and the second pressure chamber is concave shape; and
the pressure cell is suspended along an edge region on a frame.

7. The radiation collector according to claim 6, wherein the frame comprises at least one of concrete and prefabricated concrete elements.

8. The radiation collector according to claim 3, wherein:
the pressure cell has a contour which is cushion-shaped with a rectangular outline and comprises an upper membrane face and a lower membrane face, the upper membrane face being configured to be transparent for radiation to be concentrated; the concentrator is arranged between the upper membrane face and the lower membrane face such that it runs as far as an edge zone such that the first pressure chamber has a convex shape and the second pressure chamber has a concave shape; and the pressure cell is suspended along an edge region on a frame.

9. The radiation collector according to claim 3, wherein: the first pressure chamber and the second pressure chamber are filled with a fluid; a first fluid duct opens into the first pressure chamber and a second fluid duct opens into the second pressure chamber; fluid can flow through the first fluid duct and the second fluid duct in both directions in order to maintain a setpoint operating pressure; a fluid pump operated such that the respective setpoint operating pressure prevails in the associated pressure chamber.

10. Radiation collector according to claim 9, wherein the first pressure chamber and the second pressure chamber are connected to each other by means of the second fluid duct.

11. The radiation collector according to one of claim 3, wherein; the second pressure chamber comprises: a centrally placed core zone; means for operationally maintaining a core pneumatic pressure in the centrally placed core zone, and the core pneumatic pressure is smaller than a pressure of an area within the second pressure chamber but not within the centrally placed core zone.

12. The radiation collector according to claim 11, wherein: the means comprise: a sealing arrangement which operationally separates the centrally placed core zone from other regions of the second pressure chamber; and a fluid duct for allowing fluid flow out of the centrally placed core zone.

13. The radiation collector according to claim 12, wherein: the core zone and the other regions of the second pressure chamber are connected to each other by at least one fluid duct;
wherein the at least one fluid duct is adapted to allow fluid to flow in both directions therethrough to maintain a setpoint pressure difference; a fluid pump is disposed in the at least one fluid duct such that the setpoint operating pressure prevails in an associated pressure chamber.

14. The radiation collector according to claim 12, wherein a sealing arrangement comprises a sealing lip which interacts operationally with the membrane of the concentrator.

15. The radiation collector according to claim 14, wherein: the sealing lip comprises a distance from the concentrator and a semi-permeable foam strip such that a quantity of fluid that flows out of surrounding regions into the core zone is smaller than a quantity of fluid that is conveyed by the fluid pump.

16. The radiation collector according to claim 12, wherein the sealing arrangement is part of a support structure of the pressure cell and comprises concrete.

17. The radiation collector according to claim 1, wherein an overpressure zone is divided into a plurality of segments.

18. The radiation collector according to claim 17, wherein two adjacent segments bear against a fluid duct which is connected to an opening and are operationally connected to the fluid duct.

19. The radiation collector according to claim 1, wherein; the concentrator comprises a membrane
the membrane comprising at least one of PVC, PU, silicone-coated polyester fabric, a polyester foil, and fibreglass fabric; and the reflective layer comprises vapour-deposited aluminium.

20. The radiation collector according to claim 1, wherein: the first pressure chamber and the second pressure chamber comprise ethylene tetrafluoroethylene (ETFE); and
the first pressure chamber and the second pressure chamber are reinforced with at least one of high-strength PET and a steel or plastic web.

21. The radiation collector according to claim 1, wherein the collector has a rotationally symmetrical shape in an operating position and is configured as at least one of a parabolic mirror and a reflective spherical calotte.

22. The radiation collector according to claim 21, wherein a pressure chamber wall is drawn in towards the concentrator at an axis of symmetry such that the pressure chamber has approximately a configuration of an annular chamber in the operating position.

23. The radiation collector according to claim 21, wherein the collector has a shape of at least one of a well and a trough in the operating position.

24. The radiation collector according to claim 21, wherein the collector has a shape of a well with a parabolic cross section in the operating position.

25. The radiation collector according to claim 1, wherein a pressure chamber wall is drawn in towards the concentrator along a surface line of the concentrator such that the chamber has at least two segments that run parallel with respect to each other.

26. The radiation collector according to claim 1, wherein a peripheral support ring mechanically stabilizes the pressure cell and is connected in one piece to the pressure cell.

27. The radiation collector according to claim 26, wherein the peripheral support ring is an inflatable structure.

28. The radiation collector according to claim 1, wherein the first flexible membrane is pneumatically held in a first-membrane operating position solely via pressure within the first pressure chamber and the second flexible membrane, at least partially forming the second pressure chamber is pneumatically held in a second-membrane operating position via pressure within the second pressure chamber.

29. A radiation collector comprising:
- a pressure cell at least partially formed from a first flexible membrane and comprising a transparent region;
- a concentrator fixed within the pressure cell, the concentrator comprising a second flexible membrane comprising a first side facing the transparent region and a second side facing away from the transparent region;
- wherein the concentrator is disposed between a first pressure chamber and a second pressure chamber formed within the pressure cell;
- wherein the first pressure chamber and the second pressure chamber are fluidly coupled to an exterior environment; and
- wherein, responsive to changes caused by external influences of a volume of at least one of the first pressure chamber and the second pressure chamber, a predefined pressure range within the first pressure chamber and the second pressure chamber is maintained.

* * * * *

UNITED STATES PATENT AND TRADEMARK OFFICE
CERTIFICATE OF CORRECTION

| | |
|---|---|
| PATENT NO. | : 8,469,023 B2 |
| APPLICATION NO. | : 12/311306 |
| DATED | : June 25, 2013 |
| INVENTOR(S) | : Andrea Pedretti |

It is certified that error appears in the above-identified patent and that said Letters Patent is hereby corrected as shown below:

In the Claims

Column 13, Line 23, Claim 6

Replace "concave shape"
With -- concave --

Column 13, Line 64, Claim 11

Replace "to one of"
With -- to --

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.       : 8,469,023 B2                                    Page 1 of 1
APPLICATION NO.  : 12/311306
DATED            : June 25, 2013
INVENTOR(S)      : Andrea Pedretti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this
Eighth Day of September, 2015

Michelle K. Lee
*Director of the United States Patent and Trademark Office*